US012566249B2

(12) United States Patent
Srikrishnan et al.

(10) Patent No.: US 12,566,249 B2
(45) Date of Patent: Mar. 3, 2026

(54) MACHINE LEARNING-BASED RADIO FREQUENCY CIRCUIT CALIBRATION

(71) Applicant: QUALCOMM Incorporated, San Diego, CA (US)

(72) Inventors: Tharun Adithya Srikrishnan, La Jolla, CA (US); Intae Kang, San Diego, CA (US); Supratik Bhattacharjee, San Diego, CA (US); Christos Komninakis, Solana Beach, CA (US); Michael Lee McCloud, San Diego, CA (US); Gautham Hariharan, Sunnyvale, CA (US); Minkui Liu, San Diego, CA (US); Gary John Ballantyne, Christchurch (NZ)

(73) Assignee: Qualcomm Incorporated, San Diego, CA (US)

( * ) Notice: Subject to any disclaimer, the term of this patent is extended or adjusted under 35 U.S.C. 154(b) by 813 days.

(21) Appl. No.: 17/808,745

(22) Filed: Jun. 24, 2022

(65) Prior Publication Data

US 2023/0417870 A1 Dec. 28, 2023

(51) Int. Cl.
*G01S 13/42* (2006.01)
*G01S 7/40* (2006.01)

(52) U.S. Cl.
CPC ............ *G01S 7/4008* (2013.01); *G01S 13/42* (2013.01)

(58) Field of Classification Search
CPC ....... G01S 13/42; G01S 7/4008; H04B 17/14; H04B 17/22
See application file for complete search history.

(56) References Cited

U.S. PATENT DOCUMENTS

| | | |
|---|---|---|
| 10,715,199 B1 | 7/2020 | Kimball |
| 2021/0013975 A1* | 1/2021 | Jacquet .................... H01Q 3/42 |
| 2021/0014085 A1 | 1/2021 | Chen et al. |

OTHER PUBLICATIONS

International Search Report and Written Opinion—PCT/US2023/067291—ISA/EPO—Sep. 6, 2023.

* cited by examiner

*Primary Examiner* — Timothy A Brainard

(74) *Attorney, Agent, or Firm* — Patterson & Sheridan LLP

(57) ABSTRACT

Certain aspects of the present disclosure provide techniques for identifying a minimal, or at least reduced, set of representative calibration paths in radio frequency (RF) circuits and calibrating other calibration paths based on calibration codes used for the representative calibration paths. An example method generally includes receiving a calibration data set including measurements associated with each calibration path of a plurality of calibration paths in an RF circuit. Based on a clustering model and the calibration data set, a plurality of calibration clusters is generated. From each respective calibration cluster of the plurality of calibration clusters, a respective representative calibration path for is selected for the respective calibration cluster. Generally, calibration codes generated for the representative calibration path are applicable to other calibration paths in the calibration cluster. A lookup table is generated associating a respective calibration path with other calibration paths in each respective calibration cluster.

30 Claims, 7 Drawing Sheets

400

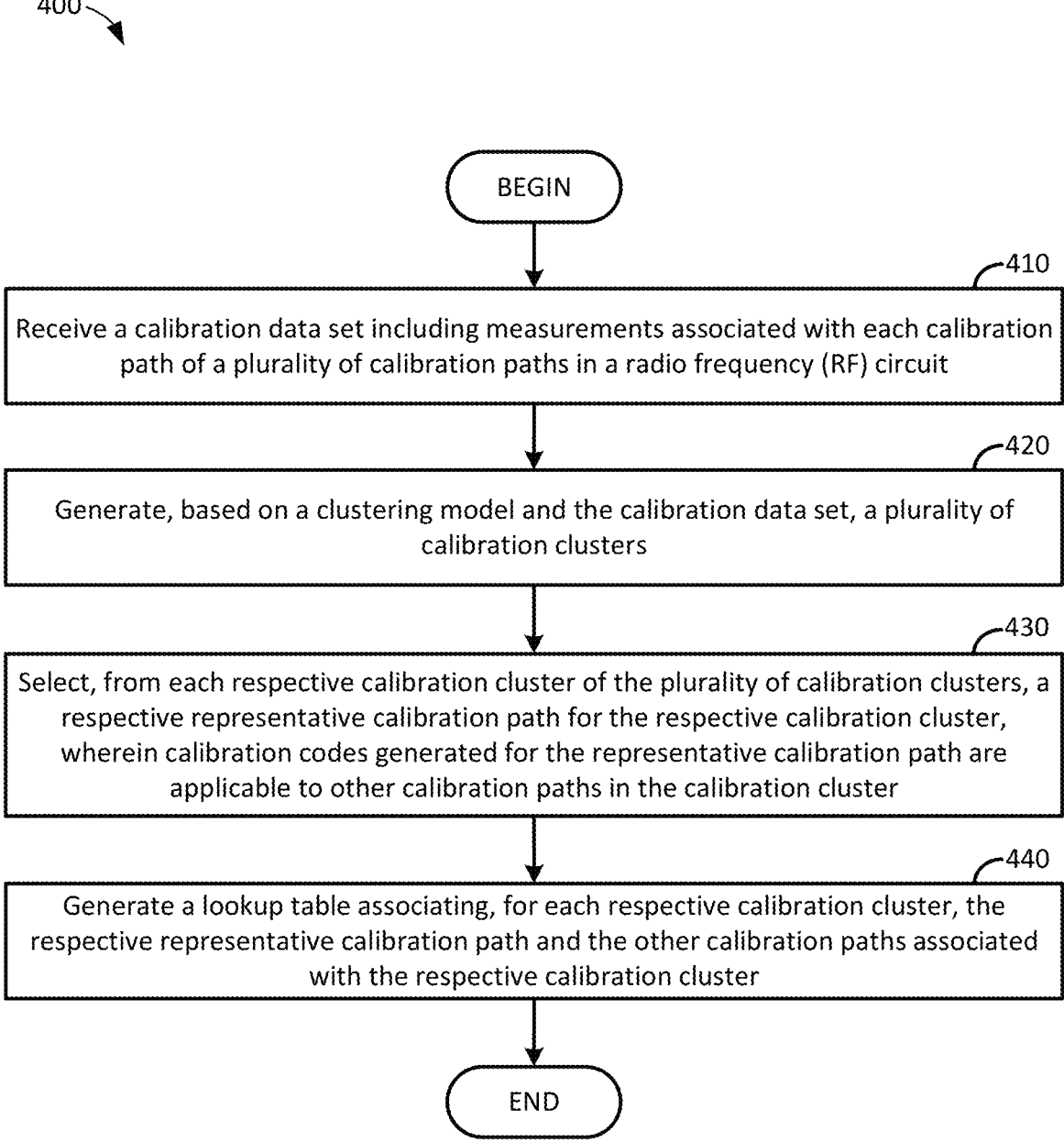

BEGIN

410

Receive a calibration data set including measurements associated with each calibration path of a plurality of calibration paths in a radio frequency (RF) circuit

420

Generate, based on a clustering model and the calibration data set, a plurality of calibration clusters

430

Select, from each respective calibration cluster of the plurality of calibration clusters, a respective representative calibration path for the respective calibration cluster, wherein calibration codes generated for the representative calibration path are applicable to other calibration paths in the calibration cluster

440

Generate a lookup table associating, for each respective calibration cluster, the respective representative calibration path and the other calibration paths associated with the respective calibration cluster

END

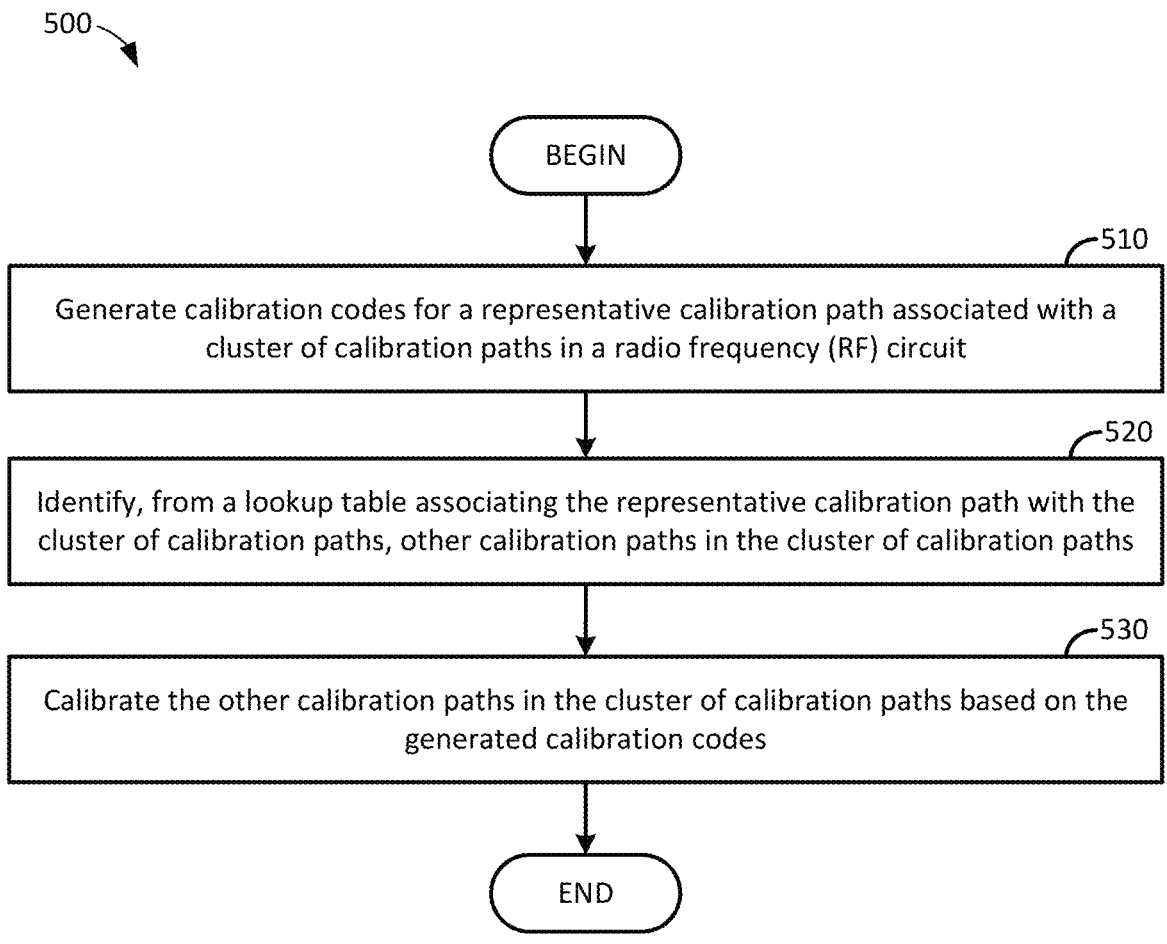

BEGIN

510

Generate calibration codes for a representative calibration path associated with a cluster of calibration paths in a radio frequency (RF) circuit

520

Identify, from a lookup table associating the representative calibration path with the cluster of calibration paths, other calibration paths in the cluster of calibration paths

530

Calibrate the other calibration paths in the cluster of calibration paths based on the generated calibration codes

END

602 — CPU

612 — WIRELESS CONNECTIVITY

604 — GPU

616 — SENSORS

606 — DSP

618 — ISPs

608 — NPU

620 — NAVIGATION

610 — MULTIMEDIA

622 — INPUT/OUTPUT

624 — MEMORY

624A — CALIBRATION DATA SET RECEIVING COMPONENT

624C — REPRESENTATIVE CALIBRATION PATH SELECTING COMPONENT

624B — CALIBRATION CLUSTER GENERATING COMPONENT

624D — LOOKUP TABLE GENERATING COMPONENT

MACHINE LEARNING-BASED RADIO FREQUENCY CIRCUIT CALIBRATION

INTRODUCTION

Aspects of the present disclosure relate to radio frequency (RF) circuit calibration and, more particularly, to using machine learning for a data-driven reduction in a number of RF circuit calibrations.

Radio frequency circuits generally allow for signaling to be converted to and from a radio frequency range for transmission to other devices or processing of signaling received from other devices. These RF circuits are generally fabricated as a set of electronic circuits that form a complete unit. Because of variations in the fabrication process, however, the properties of each RF circuit may vary. Thus, to allow for these RF circuits to perform at a similar level and/or within design specifications, each RF circuit may be individually calibrated, and the parameters with which each RF circuit is calibrated may be written to a memory associated with the RF circuit.

The complexity involved in calibrating RF circuits generally increases as these RF circuits are designed to support new functionality. For example, RF circuits may be calibrated for operations in various frequency bands (e.g., the FR1 band between 4.1 GHz and 7.125 GHz, the FR2 band between 24.25 GHz and 52.6 GHz, etc.), operations using a single antenna or using multiple antennas in multiple-input, multiple-output (MIMO) systems, or the like. For RF systems that implement MIMO techniques or allow for communications using millimeter wave frequencies, the number of uplinks and downlinks within the system may further increase the number of parameters to be calibrated. Thus, as RF circuits become more complex, and as the number of configuration parameters for these RF circuits increases, the process of calibrating RF circuits may become increasingly resource-intensive.

Accordingly, what is needed are techniques for efficiently calibrating parameters of RF circuits.

BRIEF SUMMARY

Certain aspects provide a method for radio frequency (RF) circuit calibration. The method generally includes receiving a calibration data set including measurements associated with each calibration path of a plurality of calibration paths for an RF circuit. Based on a clustering model, a plurality of calibration clusters is generated. From each respective calibration cluster of the plurality of calibration clusters, a respective representative calibration path for the respective calibration cluster is selected. Generally, calibration codes generated for the respective representative calibration path are applicable to other calibration paths in the respective calibration cluster. A lookup table is generated. The lookup table generally associates, for each respective calibration cluster, the respective representative calibration path and the other calibration paths associated with the respective calibration cluster.

Other aspects provide a method for calibrating radio frequency (RF) circuits. The method generally includes generating calibration codes for a representative calibration path associated with a calibration cluster in an RF circuit. Other calibration paths in the calibration cluster for which the generated codes are applicable are identified from a lookup table associating the representative calibration path with the calibration cluster. The other calibration paths in the calibration cluster are calibrated based on the generated calibration codes for the representative calibration path.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 4 illustrates example operations that may be performed to generate, using a clustering model, a lookup table for calibrating RF circuits based on calibration codes generated for a representative calibration path associated with each cluster of calibration paths from a plurality of clusters, according to aspects of the present disclosure.

FIG. 5 illustrates operations that may be performed to calibrate an RF circuit based on calibration codes generated for a representative calibration path associated with a cluster of calibration paths from a plurality of clusters, according to aspects of the present disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for calibrating radio frequency (RF) circuits using machine learning techniques. RF circuits are subject to variability in fabrication and operating parameters that may affect the operation of such integrated circuits. For example, variations in fabrication, such as variations in etch depths, metal or oxide layer thicknesses, impurity concentrations, and the like, may affect the impedance of individual components, threshold voltages, offsets, and the like. Further, as RF circuits become more complex, additional parameters may be configured for each RF circuit. For example, the introduction of additional functionality to support MIMO techniques, higher frequency bands (e.g., FR1 or FR2), and the like, may introduce new parameters for calibration to account for increases in uplinks and downlinks within an RF circuit and more generally to account for the additional components within the RF circuit to implement support for this additional functionality. The increase in the number of calibrations to be performed on each RF circuit as these RF circuits increase in complexity may impose significant compute resource demands (e.g., processor time, memory, etc.) for calibrating RF circuits. Further, the resources used to test these circuits may scale more than linearly, which may make RF circuit calibration an increasingly difficult and non-scalable task.

Aspects of the present disclosure provide techniques for calibrating RF circuits based on representative calibration parameter sets associated with clusters of calibration paths having similar properties from a plurality of clusters. Generally, a cluster of calibration paths may include one or more calibration paths in RF circuits associated with similar measurements, such as phase imbalance (error) measurements, frequency offset measurements, and/or other measurements, such that a representative calibration parameter set for an RF circuit calibration path at or near the center of the cluster is applicable to other calibration paths within the cluster. By using representative calibration parameter sets to calibrate clusters of calibration paths for an RF circuit, computing resources used in calibrating RF circuits may be reduced relative to performing calibration for each and every calibration path, one-by-one, for any given RF circuit.

Example Radio Frequency (RF) Circuit Calibration Pipeline

Figure 1:
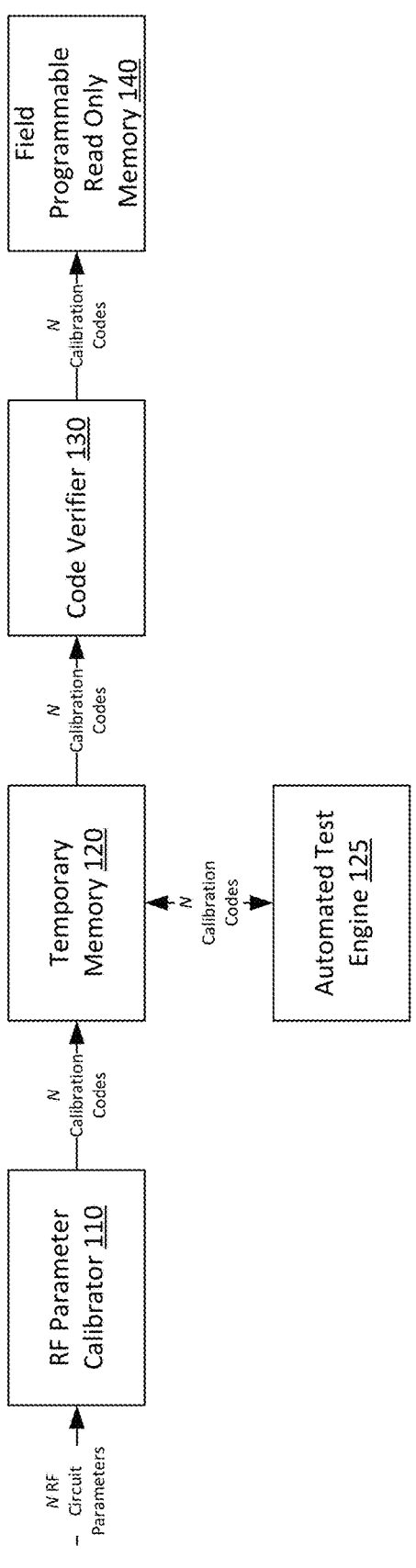
FIG. 1 depicts an example pipeline for calibrating radio frequency (RF) circuits.

FIG. 1 depicts an example pipeline 100 in which RF circuits are calibrated. As illustrated, calibration pipeline 100 includes an RF parameter calibrator 110, temporary memory 120, automated test engine 125, code verifier 130, and field programmable read-only memory (FPROM) 140.

An RF circuit being calibrated generally includes a number of circuits that allow for the upconversion of baseband or intermediate frequency signals to a radio frequency signal for transmission and for the downconversion of received radio frequency signals to intermediate or baseband frequency signals for processing. These circuits may include, for example, power amplifiers, low noise amplifiers, mixers, filters, frequency synthesizers, phase-locked loops, and the like. Generally, the number of components within an RF circuit may increase as the complexity of the RF circuit increases, for example, to support additional frequency bands (e.g., for carrier aggregation), larger numbers of antennas (e.g., diversity reception), and the like. As the number of components in the RF circuit increases, the number of circuit parameters to be calibrated may also increase.

For a number N of parameters to be calibrated, RF parameter calibrator 110 can test and calibrate each parameter and generate N calibration codes for verification. These calibration codes may include, for example, codes that adjust power usage parameters, control current biases within the RF circuit, measure and control voltages at the RF circuit, and the like. Additionally, calibration codes, or sets of calibration codes, may be associated with different calibration paths within an RF circuit. These calibration paths may include, for example, sequences of components within an RF circuit through which a signal is to be processed (e.g., for downconversion from an RF signal to an intermediate frequency signal which may be further processed to recover data received in the RF signal from another source, or for upconversion from an intermediate frequency signal to an RF signal for transmission to a destination device). Generally, as the total number of circuit parameters increases, the total number of calibrations performed by RF parameter calibrator 110 may increase.

The N calibration codes may be written to temporary memory 120, and an automated test engine 125 can access the N calibration codes stored in the temporary memory to evaluate the RF circuit being calibrated (e.g., a first pass through the measurement system). Generally, automated test engine 125 can perform various measurements, such as current draw, voltage, and the like, of the RF circuit being calibrated and can determine whether additional calibration is to be performed. Further, automated test engine 125 can log the calibration codes generated by RF parameter calibrator 110 for future use.

The N calibration codes may also be provided to code verifier 130 for verification. In some aspects, the N calibration codes may be provided to code verifier 130 for verification based on instructions generated by the automated test engine 125 to finalize the calibration of the RF circuit. Generally, in verifying these calibration codes, code verifier 130 can determine whether the RF circuit, as configured based on the N calibration codes, meets a target set of performance parameters (e.g., a second pass through the measurement system). If the target set of performance parameters is met, code verifier 130 can write the N calibration codes to FPROM 140 associated with the RF circuit (also referred to as burning the calibration codes to the FPROM). The calibration codes written to FPROM 140 may subsequently be used by the RF circuit during normal operations (e.g., in mission mode). In some aspects, code verifier 130 can calibrate the RF circuit by writing the calibration codes to one or more processor registers associated with the RF circuit or by tuning one or more analog components of the RF circuit based on the N calibration codes.

As discussed, generating and verifying the calibration codes for an RF circuit may be a resource-intensive process. First, the number of calibration codes to be generated and verified may increase as the complexity of the RF circuit increases. Additionally, for each parameter, calibration may be a multistep process that generates a calibration code, verifies the calibration code, and refines the generated calibration code based on the output of a verification process. However it may also be observed that the performance characteristics and other measurements related to different samples of an RF circuit may fall within one of a plurality of groups. For example, due to natural variance in the fabrication processes for fabricating these RF circuits, groups of RF circuits may share similar performance characteristics, and thus may share similar calibration parameter sets with minimal or no performance impact to the performance of the RF circuits within a group of RF circuits having similar performance characteristics. Thus, aspects of the present disclosure can leverage these similarities to reduce the amount of resources used to calibrate RF circuits while maintaining the performance of the RF circuits (e.g., such that these RF circuits, once calibrated, comply with a defined set of performance parameters).

Example Clustering Model-Based Radio Frequency (RF) Circuit Calibration

To leverage similarities between performance character-istics of different calibration paths within an RF circuit and/or across multiple RF circuits and the applicability of similar configuration parameter sets to calibration paths having similar performance characteristics, aspects of the present disclosure use clustering models to identify groups of calibration paths having similar performance character-istics and to identify a set of calibration parameters appli-cable to calibration paths within each group of calibration paths. By doing so, aspects of the present disclosure may minimize, or at least reduce, the number of calibration paths in an RF circuit for which calibration is performed (e.g., using calibration pipeline 100 illustrated in FIG. 1). Because a calibration parameter set is generated for a single repre-sentative calibration path within each cluster of calibration paths, aspects of the present disclosure may reduce the computing resources used in calibrating an RF circuit by reducing the number of calibration codes that are generated and verified using the calibration pipeline 100 discussed above with respect to FIG. 1.

Figure 2:
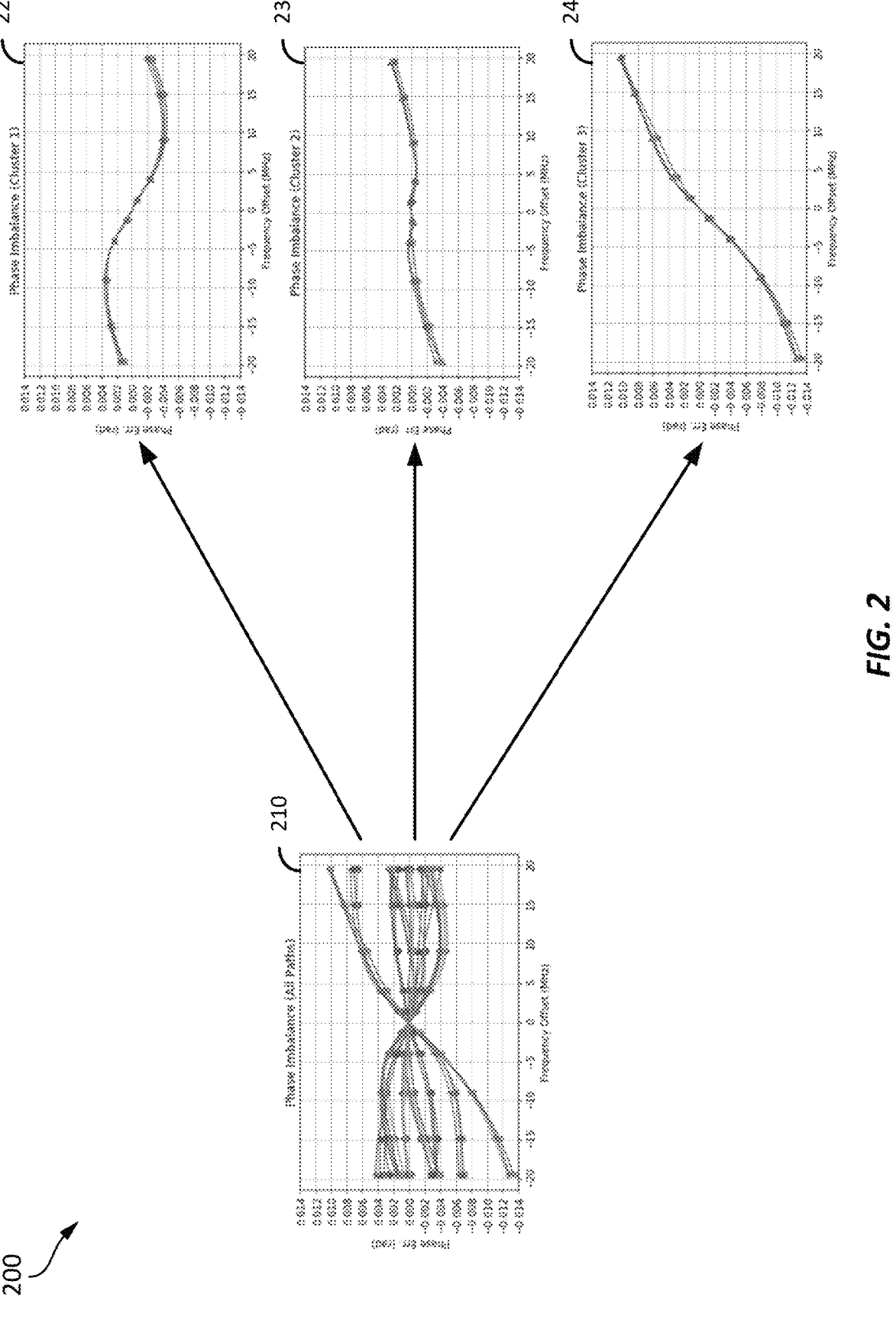
FIG. 2 illustrates an example of performance characteristics measured for a plurality of calibration paths within one or more samples of an RF circuit.

FIG. 2 illustrates an example 200 of performance char-acteristics measured for a plurality of calibration paths within one or more samples of an RF circuit. Graph 210 illustrates phase imbalance measurements obtained for a plurality of calibration paths. These phase imbalance mea-surements may be relative to an offset from a defined center frequency. These defined center frequencies may be, for example, frequencies associated with different bands on which an RF circuit can be used for wireless communica-tions. The phase imbalance measurements, as illustrated, show a phase error measured for a plurality of frequency offsets from this defined center frequency (in this example, measurements for 20 MHz below center, 15 MHz below center, 10 MHz below center, 5 MHz below center, the center frequency, 5 MHz above center, 10 MHz above center, 15 MHz above center, and 20 MHz above center).

It can be seen, in graph 210, that the calibration paths can be divided into a number of clusters of calibration paths for which RF circuits exhibit similar performance metrics (e.g., in this example, similar phase imbalance groups). For example, the calibration paths may be divided into three clusters illustrated by graphs 220, 230, 240. Graph 220, as illustrated, is associated with a cluster of calibration paths for which RF circuits exhibit a phase imbalance curve with a characteristic relationship shape and range-bound between −0.004 radians and 0.004 radians, with a peak of the curve near 10 MHz below the center frequency and a trough of the curve near 10 MHz above the center frequency. Graph 230 is associated with a cluster of calibration paths for which RF circuits exhibit a phase imbalance curve with a characteristic relationship shape and also range-bound between −0.004 radians and 0.004 radians, with a peak of the curve at 20 MHz above the center frequency and a trough of the curve at 20 MHz below the center frequency. Finally, graph 240 is associated with a cluster of calibration paths for which RF circuits exhibit a phase imbalance curve with a characteristic relationship shape and range-bound between −0.013 radians and 0.10 radians, with a peak of the curve at 20 MHz above the center frequency and a trough of the curve at 20 MHz below the center frequency. It should be understood, of course, that clusters represented by graphs 220, 230, and 240 illustrate examples of clusters of phase imbalance curves that may be identified from measurements generated over a plurality of calibration paths (e.g., obtained from one or multiple samples of an RF circuit), and other clusters with differing phase imbalance curves may also exist. Further, it should be recognized that the phase imbalance measure-ments illustrated in graphs 210, 220, 230, and 240 are only an example of the measurements that may be used in clustering calibration paths into clusters of calibration paths for which RF circuits exhibit similar performance charac-teristics, and other measurements may also or alternatively be used in clustering calibration paths into clusters of calibration paths for which RF circuits exhibit similar per-formance characteristics. These measurements may include, for example, in-phase and quadrature (I/Q) measurements, gain measurements, distortion measurements, and/or other measurements that can describe the performance character-istics of an RF circuit sample.

Because calibration paths in each cluster have similar performance characteristics, it may be assumed that a rep-resentative calibration parameter set (e.g., including a plu-rality of calibration codes, as discussed above with respect to FIG. 1) includes calibration parameters (codes) that are applicable to any calibration path within a cluster with minimal or no performance impact relative to an optimum set of calibration parameters determined for each specific calibration path using calibration pipeline 100 illustrated in FIG. 1. For example, calibration paths within the cluster illustrated by graph 220 may be calibrated using a first representative calibration parameter set; calibration paths within the cluster illustrated by graph 230 may be calibrated using a second representative calibration parameter set; and calibration paths within the cluster illustrated by graph 240 may be calibrated using a third representative calibration parameter set. By calibrating a calibration path using a representative calibration parameter set for the cluster within which the calibration path lies, the amount of time and processing resources used to calibrate a sample of an RF circuit may be significantly reduced. For example, a small number of measurements may be performed on an RF circuit in order to calibrate a subset of the calibration paths extant within the RF circuit. The calibration parameter sets for the subset of calibration paths may be used to calibrate other calibration paths within the RF circuit, which may signifi-cantly reduce the number of calibrations performed to calibrate the RF circuit relative to the number of calibrations involved to calibrate each path within the RF circuit using calibration pipeline 100 illustrated in FIG. 1 and described above.

Figure 3:
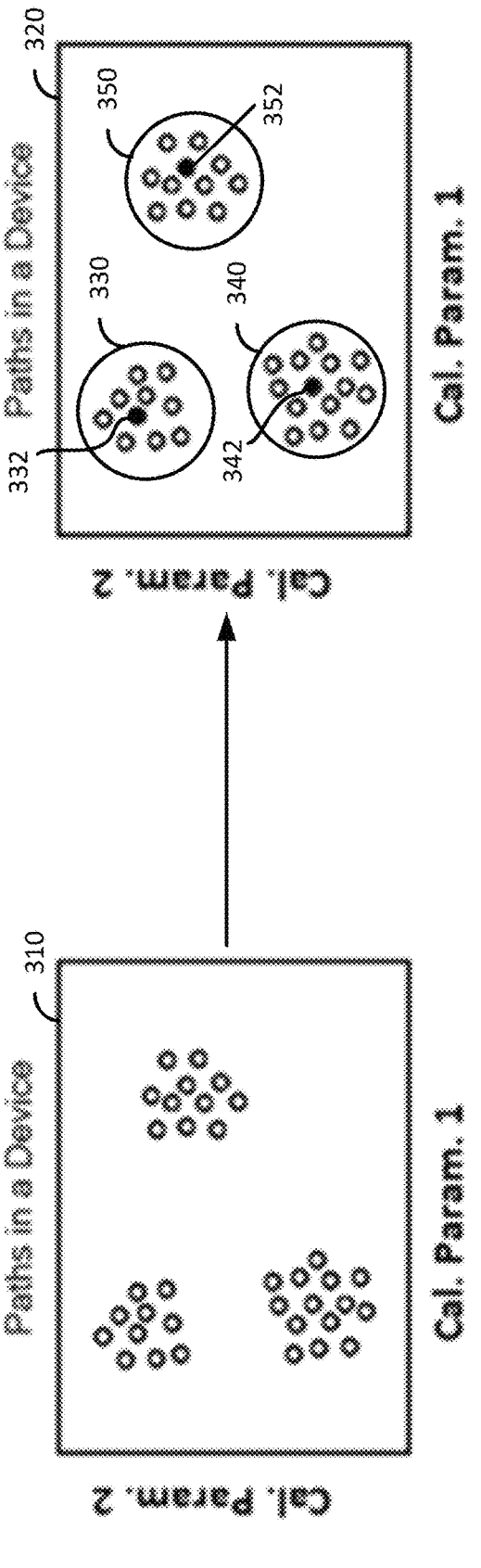
FIG. 3 illustrates an example of clustering calibration paths for RF circuits such that calibration paths within a cluster can be calibrated using a representative calibration parameter set for the cluster of calibration paths, according to aspects of the present disclosure.

FIG. 3 illustrates an example 300 of clustering calibration paths for RF circuits such that calibration paths within a cluster can be calibrated using a representative calibration parameter set for the cluster of calibration paths, according to aspects of the present disclosure.

As illustrated in chart 310, calibration paths for the RF circuit are plotted on a chart with each calibration parameter being an axis in this chart. While two calibration parameters are illustrated in chart 310, resulting in chart 310 being illustrated in two dimensions, it should be recognized that any number of calibration parameters may be used to identify clusters of calibration paths for the RF circuit, with corresponding increases in the dimensionality of chart 310. For example, three calibration parameters may be used, where clusters may be identified in three dimensions. A clustering algorithm, which may be an unsupervised machine learning model trained to group calibration parameters into a plurality of clusters, can be used to generate the clusters illustrated in chart 320. Generally, the clustering algorithm can plot a location in an n-dimensional space associated with each calibration paths of the plurality of calibration paths extant in the RF circuit. Similar calibration paths may be closely located to each other within the n-dimensional space, while different clusters of calibration paths may be located further away from each other.

As illustrated, in chart 320, the calibration paths for the RF circuit may be divided into a first cluster 330, a second cluster 340, and a third cluster 350, and each of these clusters may be associated with a respective representative calibration path 332, 342, and 352. While clusters 330, 340, and 350 are illustrated in FIG. 3 as circles, it should be understood that a cluster may assume any shape, such as an ellipse, a square, etc. defined with respect to a center point. To identify the members of a cluster, the clustering algorithm may be configured to calculate a distance between each pair of points, representing different calibration paths, in the n-dimensional space into which the clustering algorithm plots these calibration paths. For example, the clustering algorithm can plot different sets of calibration parameters, associated with different calibration paths in the RF circuit, to different locations in the n-dimensional space based on various measured performance metrics (e.g., phase imbalance, I/Q imbalance, gain, distortion, etc., which also may be referred to as "impairment" or "imperfection" metrics), and a distance between different calibration paths may be defined as a residual impairment or measured performance metric that would be experienced when the calibration associated with a first calibration path in a pair of calibration paths is used to calibrate a second calibration path in the pair of calibration paths. That is, the distance between two calibration paths, relative to a first RF circuit in a pair of circuits, may be the difference between the measured performance metric using the calibration generated for the first RF circuit and a performance metric generated by applying the calibration generated for the second RF circuit in the pair to the first RF circuit.

Generally, the calibration paths within a cluster 330, 340, or 350 may be located within a radius from a defined center point in the n-dimensional space. This defined center point may be co-extensive with a point in the n-dimensional space associated with a representative calibration path (and thus, a representative calibration parameter set) or may be located at a different location in the n-dimensional space than the representative calibration path. To identify the representative calibration path 332, 342, and 352 for each cluster 330, 340, and 350, a distance may be calculated between each calibration path in the respective cluster, and an average distance may be calculated for each calibration path in the respective cluster. The calibration path associated with the smallest average distance may be selected as the representative calibration path for the calibration paths within the cluster, and the configuration parameter set associated with the representative calibration path may be used as the calibration parameter set for calibrating each calibration path in the cluster. In this example, thus, a calibration parameter set generated (e.g., using RF circuit calibration pipeline 100 illustrated in FIG. 1) for representative calibration path 332 may be applied to the other calibration paths in cluster 330; a calibration parameter set generated for representative calibration path 342 may be applied to the other calibration paths in cluster 340, and a calibration parameter set generated for representative calibration path 352 may be applied to the other calibration paths in cluster 350.

Generally, the clusters 330, 340, and 350, and the corresponding representative calibration paths 332, 342, and 352 may be used to generate a lookup table (LUT) associating representative calibration paths with the calibration paths in the corresponding cluster. The lookup table may, in some aspects, identify a representative calibration path (e.g., by name, properties, etc.) as a key, and the other calibration paths in the cluster may be the values associated with the key. The representative calibration paths included as key values in the lookup table may be the calibration paths for which calibration parameter sets are to be generated (e.g., using calibration pipeline 100 illustrated in FIG. 1). Because the key values in the lookup table—that is, the representative calibration paths included as keys in a lookup table structured as a plurality of key-value pairings—are a subset of the extant calibration paths in an RF circuit, and because the RF circuit may be calibrated using calibration codes generated for the representative calibration paths, the number of calibration operations used to calibrate the RF circuit may be significantly reduced. Thus, RF circuit calibration can be performed more quickly, and using fewer compute resources, relative to RF circuit calibration in which calibration codes are generated separately based on each individual measurements for each calibration path in the RF circuit.

In some aspects, the calibration paths included in a calibration data set used to generate chart 320 and clusters 330, 340, and 350 may include calibration paths from a plurality of RF devices. In such a case, the representative calibration path may be representative of other calibration paths across the plurality of RF devices. While the measurements underlying calibration codes ultimately applied to any RF device will naturally differ due to the design of the RF device and variations in the fabrication process used to build the RF device, calibration paths grouped within a cluster of calibration paths may generally remain the same across the plurality of RF devices, and thus, the representative calibration path will also remain the same.

The number of clusters into which the calibration paths are clustered may be determined in a variety of manners. In some aspects, the number of clusters into which the calibration paths are clustered may be minimized. In some aspects, the number of clusters into which the calibration paths are clustered may be determined based on an a priori defined number of clusters. Generally, the number of clusters into which calibration paths for an RF circuit are clustered may be related to the performance of the RF circuit after calibration. Generally, the use of fewer clusters may allow an RF circuit to be calibrated more quickly than the use of more clusters in the lookup table (and correspondingly, more representative calibration paths for which calibration codes are to be generated); however, the use of fewer clusters over which calibration codes are generated may result in worse performance than the use of more clusters.

Generally, the resulting lookup table may be deployed to an RF circuit calibration system for calibration examples of an RF circuit based on calibration codes generated for the representative calibration paths identified in the lookup table. In calibrating an example of an RF circuit, the RF circuit calibration system can generate calibration codes (e.g., using calibration pipeline 100 illustrated in FIG. 1) for the representative calibration paths. For each representative calibration path, the RF circuit calibration system can search the lookup table for the other calibration paths (if any exist)

within a cluster associated with the representative calibration path and use the calibration codes generated for the representative calibration path for the other calibration paths in the cluster. Generally, these calibration codes may include one or more of calibration codes for in-phase and quadrature (I/Q) imbalance compensation, gain calibration, distortion compensation, or other properties for which calibration codes can be generated and applied to compensate, or at least adjust, for differences between each example of the RF circuit.

FIG. 4 illustrates example operations 400 that may be performed (e.g., by a processing system 600 illustrated in FIG. 6) to generate, using a clustering model, a lookup table for calibrating RF circuits based on calibration codes generated for a representative calibration path associated with each cluster of calibration paths from a plurality of clusters, according to aspects of the present disclosure.

As illustrated, operations 400 begin at block 410 with receiving a calibration data set. The calibration data set generally includes measurements of one or more RF circuit parameters or attributes associated with each calibration path of a plurality of calibration paths for one or more RF devices. These measurements may include, for example, measurements related to magnitude and phase error (also referred to as phase imbalance) or gain error measurements over a set of frequency offsets from a defined center frequency, gain measurements, or other measurements that characterize the performance of an RF circuit and can be used to identify clusters of calibration paths for the one or more RF devices.

At block 420, operations 400 proceed with generating, based on a clustering model and the calibration data set, a plurality of calibration clusters. Generally, each calibration cluster in the plurality of calibration clusters may include at least one calibration path. Where a calibration cluster includes one calibration path, calibration codes generated for that one calibration path may not be applicable to other calibration paths in the RF devices. Where a calibration cluster includes a plurality of calibration paths, the plurality of calibration paths may be calibration paths having similar performance characteristics and for which a single representative set of calibration codes can be used as calibration codes for the plurality of calibration paths in the cluster. For example, each calibration cluster may be associated with a magnitude value and a unique set of phase error measurements over a set of frequency offsets from a defined center frequency or other measurements that can be used to identify calibration paths having similar performance characteristics within the RF devices.

To generate the plurality of calibration clusters, a clustering model can, in some aspects, map each calibration path to a point in space based on the measurements associated with each calibration path. The space may have n dimensions, with the n dimensions corresponding to n calibration parameters for the RF circuit. For example, calibration clusters may be generated based on a single calibration parameter, such that the space is a 1-dimensional space, or using multiple parameters.

Generally, because members of a cluster should have similar performance characteristics, generating the plurality of calibration clusters generally includes identifying calibration paths having these similar performance characteristics. A similarity score between different calibration paths may be calculated as a distance from the location in the space associated with a first calibration path and the location in the space associated with a second calibration path. Within any given cluster, the distance between any pair of members may be less than a threshold distance value from a target RF performance metric.

In some aspects, the number of clusters which the clustering model generates may be selected by the model based on a minimization strategy. By minimizing the number of clusters into which calibration paths are clustered, the number of calibration paths to calibrate (e.g., using RF circuit calibration pipeline 100 illustrated in FIG. 1) may be minimized. In some aspects, the number of clusters which the clustering model generates may be defined a priori (e.g., according to one or more user-defined configuration parameters, as a hyperparameter of the clustering model, etc.). Generally, when the number of clusters is defined a priori, a tradeoff can be made between computational expense for calibrating RF circuits and the resulting performance of the RF circuit, as the calibration codes for a particular calibration path in an RF circuit may not precisely match an optimal set of calibration codes for another calibration path in the RF circuit having similar performance characteristics. Increases in the number of clusters into which calibration paths are clustered may cause an RF circuit calibration pipeline to spend additional computing resources in calibrating an RF circuit (as increases in the number of clusters into which calibration paths are clustered also increases the number of calibration paths for which calibration codes are to be generated), but may increase the resulting performance of the calibrated RF circuit relative to an RF circuit calibrated using a smaller number of calibration codes. Meanwhile, decreases in the number of calibration clusters into which calibration codes are clustered may reduce the amount of computing resources used to calibrate the RF circuit, but may decrease the resulting performance of the calibrated circuit relative to an RF circuit calibrated using a larger number of calibration codes.

In some aspects, the calibration data set may include measurements of one or more circuit parameters or attributes associated with calibration paths from a plurality of devices. The clustering model can generate the plurality of calibration clusters such that one or more of the plurality of calibration clusters includes calibration paths from the plurality of devices. Because the calibration clusters include calibration paths from the plurality of devices, the representative calibration path used for the calibration paths within the calibration clusters may be applicable across the plurality of devices.

At block 430, operations 400 proceed with selecting, from each respective calibration cluster of the plurality of calibration clusters, a respective representative calibration path for the respective calibration cluster. Generally, calibration codes generated for the representative calibration path are applicable to other calibration paths in the calibration cluster.

In some aspects, to select the representative calibration path for the respective calibration cluster, an average distance from data points associated with other calibration paths in the respective calibration cluster is calculated for each respective calibration path. The distance may be for example, an average distance between points in the space in which the calibration paths are located, with each point being associated with one or more measurements (e.g., corresponding to RF performance metrics) for the calibration path. The representative calibration path generally includes the calibration path in the respective calibration cluster having a smallest average distance, as it may be assumed that the calibration path with the smallest average distance from other calibration paths is the respective calibration cluster. Calibration paths with larger average distances from other calibration paths in the respective calibration cluster may not represent the respective calibration cluster as well as the calibration path with the smallest average distance.

At block 440, operations 400 proceed with generating a lookup table associating, for each respective calibration cluster, the respective representative calibration path and the other calibration paths associated with the respective calibration cluster. As discussed, the lookup table may use the representative calibration path for a calibration cluster as a key and the other calibration paths in the calibration cluster as the values associated with the key. The system can then deploy the generated lookup table to an RF circuit calibration system (e.g., a system on which RF circuit calibration pipeline 100 illustrated in FIG. 1 operates) to calibrate RF circuits, as described in further detail with respect to FIG. 5. When an RF circuit is to be calibrated, an RF circuit calibration pipeline can retrieve information from the lookup table identifying each representative calibration path and generate calibration codes for each of the representative calibration paths. The calibration codes for each respective representative calibration path can then be used for the other calibration paths in the calibration cluster associated with the respective representative calibration path.

FIG. 5 illustrates example operations 500 that may be performed (e.g., by a modified version of RF circuit calibration pipeline 100 illustrated in FIG. 1) to calibrate an RF circuit based on calibration codes generated for a representative calibration path associated with a cluster of calibration paths from a plurality of clusters, according to aspects of the present disclosure.

As illustrated, operations 500 begin at block 510, with generating calibration codes for a representative calibration path associated with a cluster of calibration paths in an RF circuit. As discussed, the representative calibration path is generally a calibration path serving as a key in a lookup table associating representative calibration paths with other calibration paths in a calibration cluster. The representative calibration path generally is a calibration path for which performance characteristics are representative of performance characteristics of the other calibration paths in the calibration cluster with which the representative calibration path is associated.

At block 520, operations 500 proceed with identifying, from the lookup table, other calibration paths in the cluster of calibration paths. These other calibration paths generally include calibration paths for which the generated calibration codes are applicable.

At block 530, operations 500 proceed with calibrating the other calibration paths in the cluster of calibration paths based on the generated calibration codes.

In some aspects, calibrating the other calibration paths includes writing the generated calibration codes for the representative calibration path as calibration codes for each of the other calibration paths to a memory associated with the RF circuit. In some aspects, calibrating the other calibration paths includes writing the generated calibration codes for the representative calibration path as register settings in a digital processor configured to apply adjustments to an output of the RF circuit for the other calibration paths. In some aspects, calibrating the other calibration paths comprises configuring analog components of the RF circuit for the other calibration paths based on the generated calibration codes for the representative calibration path. In each of these cases, calibrating the other paths is performed without measuring parameters for these other calibration paths.

In some aspects, calibration codes for the representative calibration path comprise one or more of a calibration code for in-phase and quadrature (I/Q) imbalance compensation, a calibration code associated with gain calibration, or a calibration code associated with second-order distortion in the RF circuit.

In some aspects, each cluster of calibration paths in the lookup table is associated with a magnitude value and a unique set of phase error measurements over a set of frequency offsets from a defined center frequency. Each calibration cluster may comprise a cluster in an n-dimensional space, and the n dimensions may correspond to n calibration parameters for the RF circuit.

Figure 6:
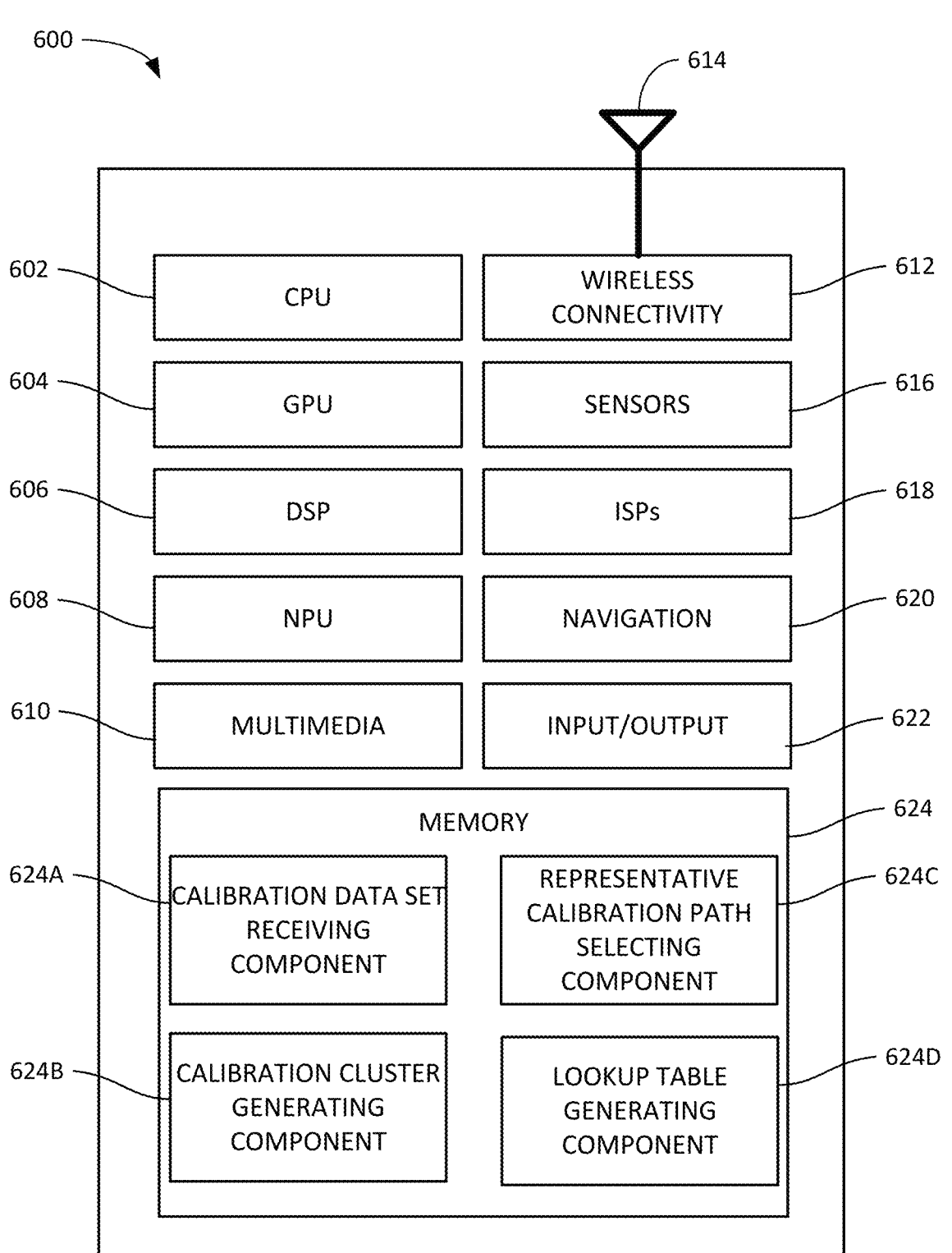
FIG. 6 illustrates an example implementation of a processing system in which a lookup table for calibrating RF circuits can be generated based on identifying a representative calibration path for each cluster of calibration paths from a plurality of clusters, according to aspects of the present disclosure.

Example Processing Systems for Calibrating RF Circuits Using Machine Learning Models FIG. 6 depicts an example processing system 600 for generating a lookup table for calibrating RF circuits based on identifying a representative calibration path for each cluster of calibration paths from a plurality of clusters, such as described herein for example with respect to FIG. 4.

Processing system 600 includes a central processing unit (CPU) 602, which in some examples may be a multi-core CPU. Instructions executed at the CPU 602 may be loaded, for example, from a program memory associated with the CPU 602 or may be loaded from memory 624.

Processing system 600 also includes additional processing components tailored to specific functions, such as a graphics processing unit (GPU) 604, a digital signal processor (DSP) 606, a neural processing unit (NPU) 608, a multimedia processing unit 610, a wireless connectivity component 612.

An NPU, such as NPU 608, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as NPU 608, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference).

In one implementation, NPU 608 is a part of one or more of CPU 602, GPU 604, and/or DSP 606.

Processing system 600 may also include one or more input and/or output devices 622, such as screens, touch-sensitive surfaces (including touch-sensitive displays), physical buttons, speakers, microphones, and the like.

In some examples, one or more of the processors of processing system 600 may be based on an ARM or RISC-V instruction set.

Processing system 600 also includes memory 624, which is representative of one or more static and/or dynamic memories, such as a dynamic random access memory, a flash-based static memory, and the like. In this example, memory 624 includes computer-executable components, which may be executed by one or more of the aforementioned processors of processing system 600.

In particular, in this example, memory 624 includes calibration data set receiving component 624A, calibration cluster generating component 624B, representative calibration path selecting component 624C, and lookup table generating component 624D. The depicted components, and others not depicted, may be configured to perform various aspects of the methods described herein.

Figure 7:
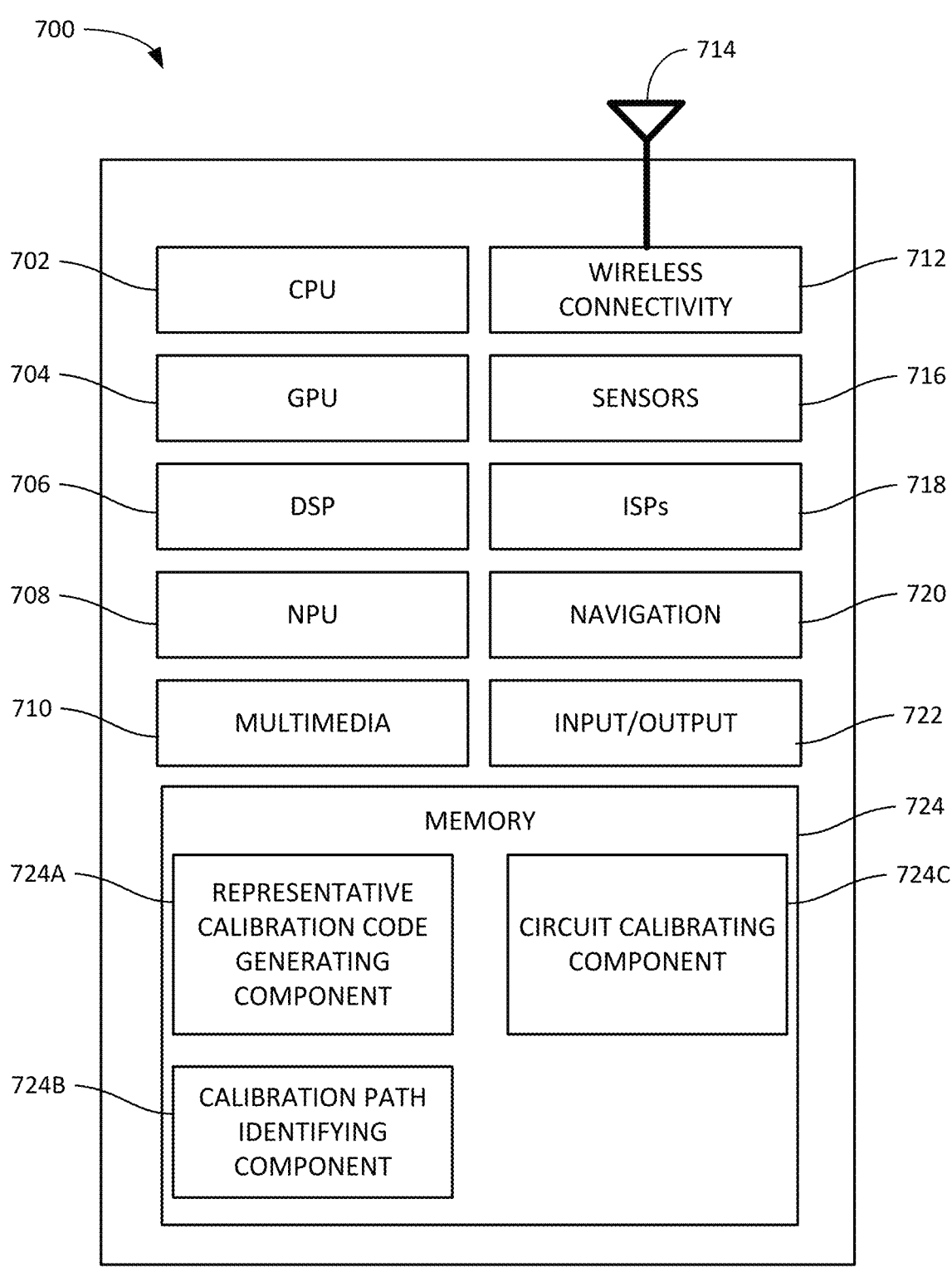
FIG. 7 illustrates an example implementation of a processing system in which an RF circuit can be calibrated based on calibration codes generated for a representative calibration path associated with a cluster of calibration paths from a plurality of clusters, according to aspects of the present disclosure.

FIG. 7 depicts an example processing system 700 for generating a lookup table for calibrating RF circuits based on identifying a representative calibration path for each cluster of calibration paths from a plurality of clusters, such as described herein for example with respect to FIG. 5.

Processing system 700 includes a central processing unit (CPU) 702, which in some examples may be a multi-core CPU. Instructions executed at the CPU 702 may be loaded, for example, from a program memory associated with the CPU 702 or may be loaded from memory 724.

Processing system 700 also includes additional processing components tailored to specific functions, such as a graphics processing unit (GPU) 704, a digital signal processor (DSP) 706, a neural processing unit (NPU) 708, a multimedia processing unit 710, a wireless connectivity component 712.

An NPU, such as NPU 708, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as NPU 708, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference).

In one implementation, NPU 708 is a part of one or more of CPU 702, GPU 704, and/or DSP 706.

Processing system 700 may also include one or more input and/or output devices 722, such as screens, touch-sensitive surfaces (including touch-sensitive displays), physical buttons, speakers, microphones, and the like.

In some examples, one or more of the processors of processing system 700 may be based on an ARM or RISC-V instruction set.

Processing system 700 also includes memory 724, which is representative of one or more static and/or dynamic memories, such as a dynamic random access memory, a flash-based static memory, and the like. In this example, memory 724 includes computer-executable components, which may be executed by one or more of the aforementioned processors of processing system 700.

In particular, in this example, memory 724 includes representative calibration code generating component 724A, calibration path identifying component 724B, and circuit calibrating component 724C, and others not depicted, may be configured to perform various aspects of the methods described herein.

Example Clauses

Implementation details of various aspects are described in the following numbered clauses.

Clause 1: A method for identifying a minimal set of calibration paths in radio frequency (RF) circuits, comprising: receiving a calibration data set including measurements associated with each calibration path of a plurality of calibration paths for an RF circuit; generating, based on a clustering model and the calibration data set, a plurality of calibration clusters; selecting, from each respective calibration cluster of the plurality of calibration clusters, a respective representative calibration path for the respective calibration cluster, wherein calibration codes generated for the representative calibration path are applicable to other calibration paths in the calibration cluster; and generating a lookup table associating, for each respective calibration cluster, the respective representative calibration path and the other calibration paths associated with the respective calibration cluster.

Clause 2: The method of Clause 1, wherein selecting the respective representative calibration path for the respective calibration cluster comprises: for each respective calibration path in the respective calibration cluster, calculating an average distance between measurements for the respective calibration path and other calibration paths in the respective calibration cluster, wherein selecting the respective representative calibration path comprises selecting a calibration path in the respective calibration cluster having a smallest average distance.

Clause 3: The method of Clause 1 or 2, wherein the respective calibration cluster comprises calibration paths having similar radio frequency performance metrics such that a distance between the representative calibration path and each calibration path in the respective calibration cluster other than the representative calibration path is below a threshold distance value from a target radio frequency performance metric.

Clause 4: The method of any of Clauses 1 through 3, wherein: the calibration data set comprises data points associated with calibration paths from a plurality of devices; and the clustering model is configured to generate calibration clusters including calibration paths over the plurality of devices, and the representative calibration path comprises a calibration path for which calibration codes are applicable to other calibration paths across the plurality of devices.

Clause 5: The method of any of Clauses 1 through 4, wherein generating the plurality of calibration clusters comprises generating calibration clusters based on a minimization of a number of clusters into which the plurality of calibration paths in the calibration data set are classified.

Clause 6: The method of any of Clauses 1 through 5, wherein generating the plurality of calibration clusters comprises generating a number of clusters according to a user-defined configuration parameter.

Clause 7: The method of any of Clauses 1 through 7, wherein each calibration cluster comprises a cluster in an n-dimensional space, and wherein the n dimensions correspond to n calibration parameters for the RF circuit.

Clause 8: The method of Clause 7, wherein n is greater than two.

Clause 9: The method of any of Clauses 1 through 8, further comprising deploying the lookup table to an RF circuit calibration system for calibrating other examples of the RF circuit based on calibration codes generated for each representative calibration path in the lookup table.

Clause 10: The method of any of Clauses 1 through 9, wherein each calibration cluster of the plurality of calibration clusters is associated with a magnitude value and a unique set of phase error measurements over a set of frequency offsets from a defined center frequency.

Clause 11: The method of any of Clauses 1 through 10, further comprising, for each respective calibration cluster of the plurality of calibration clusters: generating calibration codes for the respective representative calibration path associated with the respective calibration cluster; identifying, from the lookup table, other calibration paths in the respective calibration cluster; and calibrating the other calibration paths in the calibration cluster based on the generated calibration codes for the representative calibration path.

Clause 12: A method for calibrating a radio frequency (RF) circuit, comprising: generating calibration codes for a representative calibration path associated with a calibration cluster for an RF circuit; identifying, from a lookup table associating the representative calibration path with the calibration cluster, other calibration paths in the calibration cluster for which the generated calibration parameter set is applicable; and calibrating the other calibration paths in the calibration cluster based on the generated calibration codes for the representative calibration path.

Clause 13: The method of Clause 12, wherein calibrating the other calibration paths comprises writing the generated calibration codes for the representative calibration path as calibration codes for each of the other calibration paths to a memory associated with the RF circuit.

Clause 14: The method of Clause 12 or 13, wherein calibrating the other calibration paths comprises writing the generated calibration codes for the representative calibration path as register settings in a digital processor configured to apply adjustments to an output of the RF circuit for the other calibration paths.

Clause 15: The method of any of Clauses 12 through 14, wherein calibrating the other calibration paths comprises configuring analog components of the RF circuit for the other calibration paths based on the generated calibration codes for the representative calibration path.

Clause 16: The method of any of Clauses 12 through 15, wherein the calibration codes for the representative calibration path comprises one or more of a calibration code for in-phase and quadrature (I/Q) imbalance adjustment, a calibration code associated with gain calibration, or a calibration code associated with second-order distortion in the RF circuit.

Clause 17: The method of any of Clauses 12 through 16, wherein each calibration cluster in the lookup table is associated with a magnitude value and a unique set of phase error measurements over a set of frequency offsets from a defined center frequency.

Clause 18: The method of any of Clauses 12 through 17, wherein each calibration cluster comprises a cluster in an n-dimensional space, and wherein the n dimensions correspond to n calibration parameters for the RF circuit.

Clause 19: An apparatus, comprising: a memory having executable instructions stored thereon; and a processor configured to execute the executable instructions to cause the apparatus to perform a method in accordance with of any of Clauses 1 through 18.

Clause 20: An apparatus, comprising means for performing a method in accordance with of any of Clauses 1 through 18.

Clause 21: A non-transitory computer-readable medium having instructions stored thereon which, when executed by a processor, performs a method in accordance with of any of Clauses 1 through 18.

Clause 22: A computer program product embodied on a computer-readable storage medium comprising code for performing a method in accordance with of any of Clauses 1 through 18.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for radio frequency (RF) circuit calibration, comprising:

receiving a calibration data set including measurements associated with each calibration path of a plurality of calibration paths for an RF circuit;

generating, based on a clustering model and the calibration data set, a plurality of calibration clusters;

selecting, from each respective calibration cluster of the plurality of calibration clusters, a respective representative calibration path for the respective calibration cluster, wherein calibration codes generated for the respective representative calibration path are applicable to other calibration paths in the respective calibration cluster;

generating a lookup table associating, for each respective calibration cluster, the respective representative calibration path and the other calibration paths associated with the respective calibration cluster; and deploying the lookup table to perform the RF circuit calibration.

2. The method of claim 1, wherein selecting the respective representative calibration path for the respective calibration cluster comprises:

for each respective calibration path in the respective calibration cluster, calculating an average distance between data points for the respective calibration path and other calibration paths in the respective calibration cluster; and selecting a calibration path in the respective calibration cluster having a smallest average distance.

3. The method of claim 2, wherein a distance between a data point for the respective calibration path and another calibration path in the respective calibration cluster comprises a difference between an impairment metric measured when calibration parameters used for the respective calibration path are used to calibrate the RF circuit and an impairment metric measured when calibration parameters for the other calibration path are used to calibrate the RF circuit.

4. The method of claim 1, wherein the respective calibration cluster comprises calibration paths having similar radio frequency performance metrics such that a distance between the respective representative calibration path and each calibration path in the respective calibration cluster other than the respective representative calibration path is below a threshold distance value from a target radio frequency performance metric.

5. The method of claim 1, wherein:

the calibration data set comprises measurements associated with calibration paths from a plurality of devices; and the clustering model is configured to generate calibration clusters including calibration paths over the plurality of devices, wherein the respective representative calibration path comprises a calibration path for which calibration codes are applicable to other calibration paths within the respective calibration cluster.

6. The method of claim 1, wherein generating the plurality of calibration clusters comprises generating calibration clusters based on a minimization of a number of clusters into which the plurality of calibration paths in the calibration data set are classified.

7. The method of claim 1, wherein generating the plurality of calibration clusters comprises generating a number of clusters according to a user-defined configuration parameter.

8. The method of claim 1, wherein each calibration cluster comprises a cluster in an n-dimensional space, and wherein the n dimensions correspond to n calibration parameters for the RF circuit.

9. The method of claim 8, wherein n is greater than two.

10. The method of claim 1, wherein deploying the lookup table includes deploying the lookup table to an RF circuit calibration system for calibrating other examples of the RF circuit based on calibration codes generated for each representative calibration path in the lookup table.

11. The method of claim 1, wherein each calibration cluster of the plurality of calibration clusters is associated with a magnitude value and a unique set of phase error measurements or gain error measurements over a set of frequency offsets from a defined center frequency.

12. The method of claim 1, further comprising, for each respective calibration cluster of the plurality of calibration clusters:

generating calibration codes for the respective representative calibration path associated with the respective calibration cluster, identifying, from the lookup table, other calibration paths in the respective calibration cluster; and calibrating the other calibration paths in the respective calibration cluster based on the generated calibration codes for the respective representative calibration path.

13. A method for calibrating a radio frequency (RF) circuit, comprising:

generating calibration codes for a representative calibration path associated with a calibration cluster in an RF circuit;

identifying, from a lookup table associating the representative calibration path with the calibration cluster, other calibration paths in the calibration cluster for which the generated calibration codes are applicable; and calibrating the other calibration paths in the calibration cluster based on the generated calibration codes for the representative calibration path.

14. The method of claim 13, wherein calibrating the other calibration paths comprises writing the generated calibration codes for the representative calibration path as calibration codes for each of the other calibration paths to a memory associated with the RF circuit.

15. The method of claim 13, wherein calibrating the other calibration paths comprises writing the generated calibration codes for the representative calibration path as register settings in a digital processor configured to apply adjustments to an output of the RF circuit for the other calibration paths.

16. The method of claim 13, wherein calibrating the other calibration paths comprises configuring analog components of the RF circuit for the other calibration paths based on the generated calibration codes for the representative calibration path.

17. The method of claim 13, wherein the calibration codes for the representative calibration path comprise one or more of a calibration code for in-phase and quadrature (I/Q) imbalance adjustment, a calibration code associated with gain calibration, or a calibration code associated with second-order distortion in the RF circuit.

18. The method of claim 13, wherein each calibration cluster in the lookup table is associated with a magnitude value and a unique set of phase error measurements or gain error measurements over a set of frequency offsets from a defined center frequency.

19. The method of claim 13, wherein each calibration cluster comprises a cluster in an n-dimensional space, and wherein the n dimensions correspond to n calibration parameters for the RF circuit.

20. A system, comprising:

memory having executable instructions stored thereon; and one or more processors, individually or collectively, configured to execute the executable instructions to cause the system to:

receive a calibration data set including measurements associated with each calibration path of a plurality of calibration paths in an RF circuit;

generate, based on a clustering model and the calibration data set, a plurality of calibration clusters;

select, from each respective calibration cluster of the plurality of calibration clusters, a respective representative calibration path for the respective calibration cluster, wherein calibration codes generated for the respective representative calibration path are applicable to other calibration paths in the calibration cluster; and generate a lookup table associating, for each respective calibration cluster, the respective representative calibration path and the other calibration paths associated with the respective calibration cluster; and deploy the lookup table to perform radio frequency (RF) circuit calibration.

21. The system of claim 20, wherein:

in order to select the respective representative calibration path for the respective calibration cluster, the one or more processors, individually or collectively, are configured to cause the system to calculate, for each respective calibration path in the respective calibration cluster, an average distance between data points for the respective calibration path and other calibration paths in the respective calibration cluster; and in order to select the respective representative calibration path, the one or more processors, individually or collectively, are configured to cause the system to select a calibration path in the respective calibration cluster having a smallest average distance.

22. The system of claim 20, wherein the respective calibration cluster comprises calibration paths having similar radio frequency performance metrics such that a distance between the respective representative calibration path and each calibration path in the respective calibration cluster other than the respective representative calibration path is below a threshold distance value from a target radio frequency performance metric.

23. The system of claim 20, wherein:

the calibration data set comprises measurements associated with calibration paths from a plurality of devices; and the clustering model is configured to generate calibration clusters including calibration paths over the plurality of devices, wherein the respective representative calibration path comprises a calibration path for which calibration codes are applicable to other calibration paths within the respective calibration cluster.

24. The system of claim 20, wherein each calibration cluster comprises a cluster in an n-dimensional space, and wherein the n dimensions correspond to n calibration parameters for the RF circuit.

25. The system of claim 20, wherein, to deploy the lookup table, the one or more processors, individually or collectively, are configured to cause the system to deploy the lookup table to an RF circuit calibration system for calibrating other examples of the RF circuit based on calibration codes generated for each representative calibration path in the lookup table.

26. The system of claim 20, wherein each calibration cluster of the plurality of calibration clusters is associated with a magnitude value and a unique set of phase error measurements or gain error measurements over a set of frequency offsets from a defined center frequency.

27. The system of claim 20, wherein the one or more processors, individually or collectively, are further configured to cause the system to, for each respective calibration cluster of the plurality of calibration clusters:

generate calibration codes for the respective representative calibration path associated with the respective calibration cluster;

identify, from the lookup table, other calibration paths in the respective calibration cluster; and calibrate the other calibration paths in the respective calibration cluster based on the generated calibration codes for the respective representative calibration path.

28. A system comprising:

memory having executable instructions stored thereon; and one or more processors, individually or collectively, configured to execute the executable instructions in order to cause the system to:

generate calibration codes for a representative calibration path associated with a calibration cluster in a radio frequency (RF) circuit;

identify, from a lookup table associating the representative calibration path with the calibration cluster, other calibration paths in the calibration cluster for which the generated calibration codes are applicable; and calibrate the other calibration paths in the calibration cluster based on the generated calibration codes for the representative calibration path.

29. The system of claim 28, wherein in order to calibrate the other calibration paths, the one or more processors, individually or collectively, are configured to write the generated calibration codes for the representative calibration path as calibration codes for each of the other calibration paths to memory associated with the RF circuit.

30. The system of claim 28, wherein each calibration cluster in the lookup table is associated with a magnitude value and a unique set of phase error measurements or gain error measurements over a set of frequency offsets from a defined center frequency.

* * * * *